(12) United States Patent
Nanu et al.

(10) Patent No.: US 8,334,926 B2
(45) Date of Patent: Dec. 18, 2012

(54) IN-CAMERA BASED METHOD OF DETECTING DEFECT EYE WITH HIGH ACCURACY

(75) Inventors: Florin Nanu, Bucharest (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 35 days.

(21) Appl. No.: 13/164,685

(22) Filed: Jun. 20, 2011

(65) Prior Publication Data
US 2011/0304748 A1    Dec. 15, 2011

Related U.S. Application Data

(62) Division of application No. 12/191,304, filed on Aug. 14, 2008, now Pat. No. 8,081,254.

(51) Int. Cl.
*H04N 5/222* (2006.01)
*H04N 5/235* (2006.01)

(52) U.S. Cl. ............ 348/370; 348/363; 348/371

(58) Field of Classification Search ............ 348/240, 348/362, 367, 373, 370; 396/88, 155, 157, 396/158, 161, 177
See application file for complete search history.

(56) References Cited

U.S. PATENT DOCUMENTS

| 5,649,238 | A | 7/1997 | Wakabayashi et al. |
| 5,678,073 | A | 10/1997 | Stephenson, III et al. |
| 5,708,866 | A | 1/1998 | Leonard |
| 6,035,072 | A | 3/2000 | Read |
| 6,407,777 | B1 | 6/2002 | DeLuca |
| 6,734,911 | B1 | 5/2004 | Lyons |
| 6,859,565 | B2 | 2/2005 | Baron |
| 7,027,662 | B2 | 4/2006 | Baron |
| 7,042,505 | B1 | 5/2006 | DeLuca |
| 7,269,292 | B2 | 9/2007 | Steinberg |
| 7,295,233 | B2 | 11/2007 | Steinberg et al. |
| 7,315,631 | B1 | 1/2008 | Corcoran et al. |
| 7,336,821 | B2 | 2/2008 | Ciuc et al. |
| 7,352,394 | B1 | 4/2008 | DeLuca et al. |
| 7,362,368 | B2 | 4/2008 | Steinberg et al. |
| 7,369,712 | B2 | 5/2008 | Steinberg et al. |
| 7,819,525 | B2 | 10/2010 | Connell, II |
| 2003/0118217 | A1 | 6/2003 | Kondo et al. |
| 2004/0057622 | A1 | 3/2004 | Bradski et al. |

(Continued)

FOREIGN PATENT DOCUMENTS

WO    2010/017953 A1    2/2010

OTHER PUBLICATIONS

PCT Notification of Transmittal of the International Search Report and the Written Opinion of the International Searching Authority, or the Declaration, for PCT Application No. PCT/EP2009/005809, dated Nov. 24, 2009, 12 pages.

(Continued)

*Primary Examiner* — John Villecco
*Assistant Examiner* — Selam Gebriel
(74) *Attorney, Agent, or Firm* — Andrew V. Smith

(57) ABSTRACT

A portable digital image acquisition device includes multiple lenses and/or multiple flashes. A main digital image and first and second reference images are acquired. The first and second reference images are acquired with different flash-lens combinations that have different flash-lens distances. One or more flash eye defects are detected and corrected in the main image based on analysis of the first and second reference images.

39 Claims, 4 Drawing Sheets
(1 of 4 Drawing Sheet(s) Filed in Color)

U.S. PATENT DOCUMENTS

| | | |
|---|---|---|
| 2004/0170304 A1 | 9/2004 | Haven et al. |
| 2004/0223063 A1 | 11/2004 | DeLuca et al. |
| 2005/0041121 A1 | 2/2005 | Steinberg et al. |
| 2005/0140801 A1 | 6/2005 | Prilutsky et al. |
| 2005/0199783 A1 | 9/2005 | Wenstrand et al. |
| 2006/0039690 A1 | 2/2006 | Steinberg et al. |
| 2006/0093213 A1 | 5/2006 | Steinberg et al. |
| 2006/0120599 A1 | 6/2006 | Steinberg et al. |
| 2007/0116379 A1 | 5/2007 | Corcoran et al. |
| 2007/0116380 A1 | 5/2007 | Ciuc et al. |
| 2007/0201724 A1 | 8/2007 | Steinberg et al. |

OTHER PUBLICATIONS

Agrawal A. et al., Removing photography artifacts using gradient projection and flash-exposure sampling, ACM Transactions on Graphics, ACM, US. 2005, pp. 828-835, XP002442303, ISSN: 0730-0301.

IN-CAMERA BASED METHOD OF DETECTING DEFECT EYE WITH HIGH ACCURACY

PRIORITY

This application is a Division of U.S. patent application Ser. No. 12/191,304, filed Aug. 14, 2008; which is incorporated by reference.

BACKGROUND OF THE INVENTION

It is known to capture non-flash images followed by flash images and by subtracting these images (including some luminance normalizing), one can get a difference image which indicates where red-eye defects (flash-eyes) are located. U.S. Pat. Nos. 7,027,662 and 6,859,565 are incorporated by reference.

In addition, US published patent application 2005/0041121, entitled "Red-eye filter method and apparatus", which is assigned to the same assignee as the present application and incorporated by reference, describes techniques wherein a reference non-flash and the main flash image may initially be of different sizes, and where the images are sized to the same dimensions and aligned before luminance normalization and/or subtraction.

It is desired to have an improved technique involving capturing two images that are normalized for luminance and then subtracted, indicating the likely eye locations in a main acquired image, followed by acquisition of a main image. The process would be performed quickly (typically less than 1 second) to minimize any misalignment of the reference pair and the main acquired image.

It is also desired to have a technique that overcomes problems associated with the non-flash image tending to be significantly darker than the flash image and, particularly in indoor environments, wherein it is difficult to achieve practical luminance normalization.

SUMMARY OF THE INVENTION

A portable digital image acquisition device is provided. The device includes a lens and a sensor for acquiring a main digital image and first and second reference images. The device also includes first and second light sources disposed at different distances from the lens for illuminating one or more objects within an acquired scene. The main image is stored in a memory. The device also includes one or more processor-readable media having digital code embedded therein for programming a processor to perform a method of determining and correcting a flash eye defect in the main digital image using the first and second reference images. The method includes acquiring the first and second reference images respectively using the first and second light sources. The first and second images are normalized to generate normalized first and second reference images. One or more differences between the first and second normalized reference images are analyzed. The method further includes determining and correcting the flash eye defect within the main image based on the analyzing to generate a corrected main image. The corrected main image or a further processed version is stored, transmitted, communicated, displayed, and/or projected.

Another portable digital image acquisition device is provided. This device includes first and second lenses and at least one sensor for acquiring a main digital image and first and second reference images. The device also includes a light source disposed at different distances from the first and second lenses respectively for illuminating one or more objects within an acquired scene. The main digital image and/or a further processed version is stored in a memory. The device includes one or more processor-readable media having digital code embedded therein for programming a processor to perform a method of determining and correcting a flash eye defect in the main digital image using the first and second reference images. The method includes acquiring the first and second reference images using the light source and the first and second lenses respectively. The first and second images are normalized to generate normalized first and second reference images. One or more differences between the first and second normalized reference images are analyzed. The method further includes determining and correcting the flash eye defect within the main image based on the analyzing to generate a corrected main image. The corrected main image and/or further processed version is stored, transmitted, communicated, displayed, and/or projected.

In either device, the analyzing may include subtracting the first and second reference images.

The normalizing may include luminance normalizing.

The flash eye defect may include a red eye defect.

The normalizing may include re-sizing one or both of the first and second reference images.

The normalizing may include aligning the first and second reference images. The aligning may include aligning one or more eyes within the first and second images.

The differences may include color differences and/or brightness differences.

The first and second reference images may be each acquired using relatively low-intensity pre-flashes compared with an intensity of a flash used in acquiring the main digital image.

The analyzing may take into account the specific different distances between the first and second light sources and the lens in the first device, or between the first and second lenses and the light source in the second device.

The analyzing may further take into account distance to one or more objects, a gaze angle, an ambient lighting condition, color of an iris and/or a skin tone of a face within the acquired scene.

The first and second preview images may be acquired consecutively prior to acquiring the main digital image.

Methods determining and correcting a flash eye defect in the main digital image using the first and second reference images are also provided. Computer readable media having embedded code for programming a processor to perform the methods are also provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

It is recognized herein that if a light source is located at a different spatial distance from an imaging lens, the color and brightness of eye regions in the image can vary significantly. At the same time, the remainder of the image will not vary as much in color and brightness.

Figure 1A:
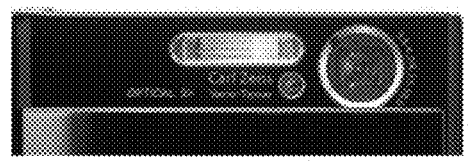
FIG. 1A illustrates a camera with a flash close to an optical lens for acquiring an image.
Figure 1B:
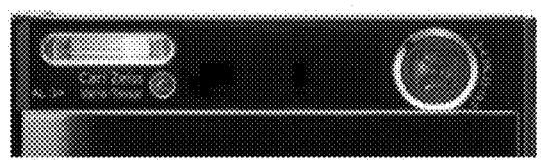
FIG. 1B illustrates a camera with a flash farther from an optical lens than the flash illustrated in FIG. 1A.
Figure 2A:
FIGS. 2A, 3A and 4A illustrate flash eye defects in digital images acquired with the camera of FIG. 1A.
Figure 2B:
FIGS. 2B, 3B and 4B illustrate flash eye defects in digital images acquired with the camera of FIG. 1B.
Figure 3A:
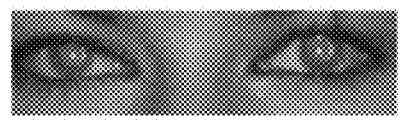
Figure 3B:
Figure 4A:
Figure 4B:
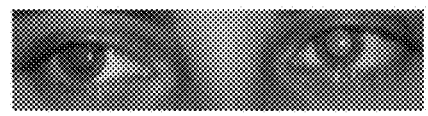

FIGS. 1A and 1B illustrate two cameras each having a single flash and a single lens. However, the flash-lens distance is greater for the camera of FIG. 1B than for that of FIG. 1A. FIGS. 2A, 3A and 4A are pictures taken of at least the eyes of three people with the camera of FIG. 1A. FIGS. 2B, 2C and 2D are pictures taken of at least the eye of the same three people with the camera of FIG. 1B. FIG. 2A clearly shows a lighter red than the eyes of the same person captured in FIG. 2B. The eyes also appear to be brighter n FIG. 2A than in FIG. 2B. FIG. 3A clearly shows a lighter red than the eyes of the same person captured in FIG. 3B. The eyes also appear to be brighter n FIG. 3A than in FIG. 3B. The right eye in FIG. 4A taken with the camera of FIG. 1A appears as a lighter red than the right eye of the same person in FIG. 4B taken with the camera if FIG. 1B. The left eye in FIG. 4A appears golden and very bright, while the left eye in FIG. 4B appears red and not nearly as bright as the left eye of FIG. 4A. The differences between the eyes captured in FIGS. 2A, 3A and 4A and those of FIGS. 2B, 3B and 4B is the different distances between the flashes and the optical lenses of the respective cameras used as illustrated at FIGS. 1A and 1B. Other features of the partial faces shown in FIGS. 2A and 2B do not appear to differ significantly, and same for FIGS. 3A-3B and 4A-4B.

Figure 5:
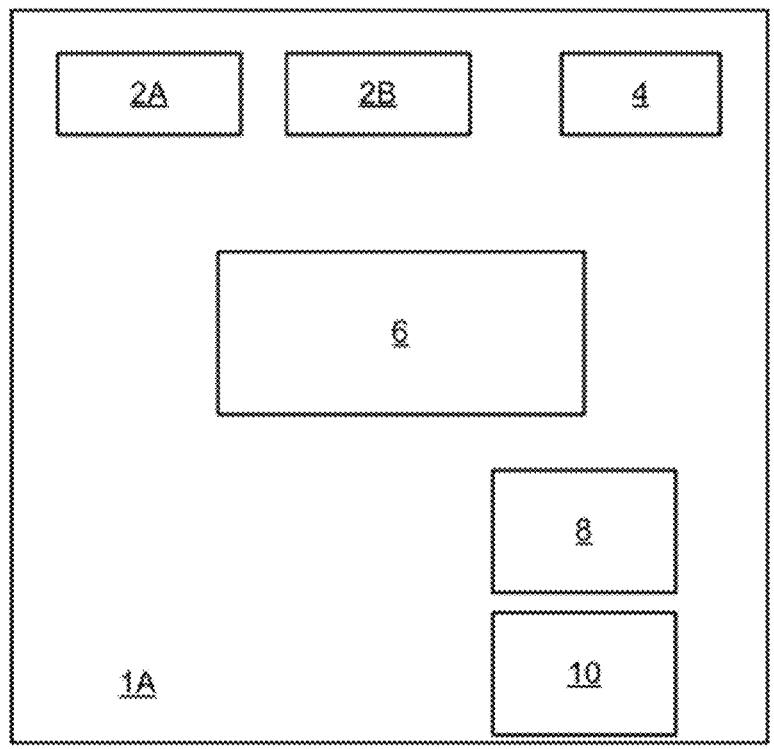
FIG. 5 illustrates a camera with two flashes separated at different distances from the camera's lens.

In accordance with certain embodiments, FIG. 5 schematically illustrates a camera with two distinct light sources 2a and 2b at different distances from a main lens 4. Two reference images, which may be preview, post-view and/or concurrent view images, are acquired using a low-intensity pre-flash from the two distinct flash units 2a, 2b. The camera illustrated schematically at FIG. 5 also includes a photosensor 6 such as a CMOS sensor aligned with lens 4 for digitally-capturing images including the preview images and main images intended to be stored, transmitted, displayed, projected, communicated and/or further processed. The camera also includes a processor 8 and one or more digital media 10 having program code stored therein. These media 10 and/or other media may be used to store image data as well. The camera can have other features such as one or more ports for connecting to another device such as a printer, PC, display device, another camera, phone, etc., with a cable or wirelessly, and/or for plugging in a flash card or other mountable device.

With the camera 1A illustrated schematically at FIG. 5, methods of detecting and corrected all kinds of defect eyes with high accuracy are provided on a digital flash camera. Certain embodiments take into greater account a red eye flash defect by concentrating on differences in color between the two preview or other reference images, while other embodiments take into greater account other defects such as golden eye, white eye, and/or zombie eye. The method is based on the effect of reflection from the eyes of the flash light to the CCD and/or CMOS of the camera. Such is a function of few parameters. That is, a defect eye distribution is a function of flash-lens positioning, distance to the subject, gaze angle, ambient lighting conditions, color of the iris, race, among other factors. The method of certain embodiments exploits variations of the defect eye distribution with the distance between the lens and the main light source of the camera (flash lamp, focusing LED, or any other source light).

The distribution of defects changes with the distance between the flash lamp and the lens, as does the character of the defects. The frequency of getting other than red defect eyes decreases with the increasing of the distance between the flash and lens. In addition, the intensity of the defect eyes decreases with the increasing of the distance between the flash and lens. For example, a distance between the first flash and the lens may be 2 cm, while the distance between the second flash and lens may be 5 cm. An optimal positioning of the two light sources 2a, 2b would provide a maximum difference between the distribution of the defect eyes on the two preview or other reference images, and a minimum difference between the rest of the preview images.

The two flash light sources may be identical light sources 2a, 2b, e.g., flash lamps, or two focusing lamps, or LEDs, on a same camera 1A at two different positions relative to the lens 4. The light sources may differ and the camera 1A would have software that would take the differences into account. However, the two identical light sources, except as to position relative to lens 4, provide two almost identical preview or other reference images. In this way, it is possible and optimal to get the difference map of the two previews.

The camera 1A is able to take two consecutive preview pictures, just before the final flash picture, or two post-view pictures, or one of each. The first preview or other reference image is taken with the first light source 2a of the camera 1A, and the second preview or other reference image is taken with the second light source 2b.

A difference map of the two preview or other reference images is generated. The differences could be determined in various ways, e.g., on the red channel only for detecting red eye defects, starting from the closer source light preview, or on the luminance channel only for white eye defects or golden eye defects.

A first source light 2a is preferably located very close to the lens 4 of camera 1A. For example, the light 2a may be 1 cm or 2 cm on the right or left side of the lens as illustrated at FIG. 1a. The second light source 2b may be on the right or left side of the lens 4 a longer distance such as 4 cm or 5 cm from the lens 4 such as illustrated at FIG. 2b. A first preview image may be captured using flash 2a, while a second preview image may be captured using flash 2b. Then the main image may be captured. As indicated, postview images may be captured instead. A difference map of the preview or postview images is calculated. The difference map is filtered to eliminate small differences, shadows, etc, and the significant differences that remain will be analyzed as probably or at least possible defect eyes subject to flash eye defect correction algorithm. The sources 2a, 2b may be in the simplest form two focusing lamps (e.g., LEDs) or in a complex form two flash lamps.

Figure 6:
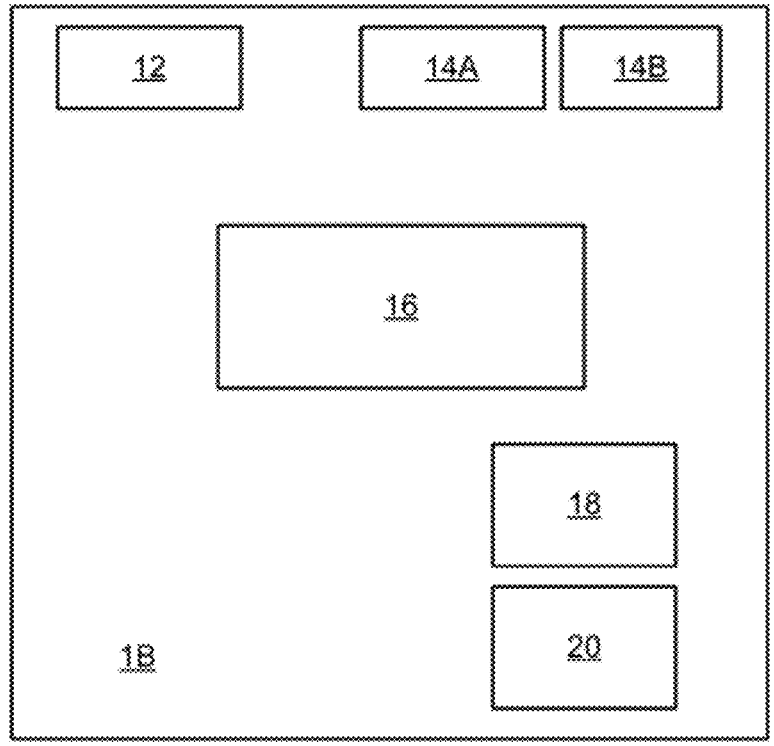
FIG. 6 illustrates a camera with two optical lenses separated at different distances from the camera's flash.

In accordance with further embodiments, FIG. 6 schematically illustrates a camera with a light source 12 and two distinct optical systems/lenses 14a and 14b at different distances from the flash 12. Two preview images may be acquired using a low-intensity pre-flash from the flash unit 12. The camera illustrated schematically at FIG. 6 also includes at least one photosensor 6 aligned with lenses 14a, 14b, e.g., two separate photosensors one for each lens 14a, 14b or a single sensor, for digitally-capturing images including the preview images and main images intended to be stored, transmitted, displayed, projected, communicated and/or further processed. The camera also includes a processor 18 and one or more digital media 20 having program code stored therein. These media 20 and/or other media may be used to store image data as well. The camera can have other features such as one or more ports for connecting to another device such as a printer, PC, display device, another camera, phone, etc., with a cable or wirelessly, and/or for plugging in a flash card or other mountable device.

In the embodiment of FIG. 6, a camera 1B has a single flash unit 12 and two imaging lenses 14a, 14b. A full dual imaging pipeline may be provided as well. In this embodiment, a first preview image is acquired using one of the imaging lenses 14a with a pre-flash illumination. At or near the same time, a second preview image is acquired using the second imaging lens 14b with illumination from the same weak pre-flash. The result is a pair of simultaneous preview images each being a different distance from the flash source. Any alignment errors will be solely due to geometrical factors rather than due to subject or camera movement and a compensation algorithm can be pre-calibrated.

The reference images captured using the different flashes 2a, 2b of the camera of FIG. 5, or with the two sensors 14a, 14b with the camera of FIG. 6, may then be compared, subtracted (with or without luminance normalizing) and/or otherwise analyzed. As only the eye regions will have very different characteristics, the locations of eye regions may be determined in this way. A third flash image may then be obtained using a full strength flash. This may be achieved by applying greater power to one of the flash units 2a, 2b, 12 or by combining the two flash units 2a, 2b together in the camera of FIG. 5, or otherwise such as by including a third flash.

Figure 7:
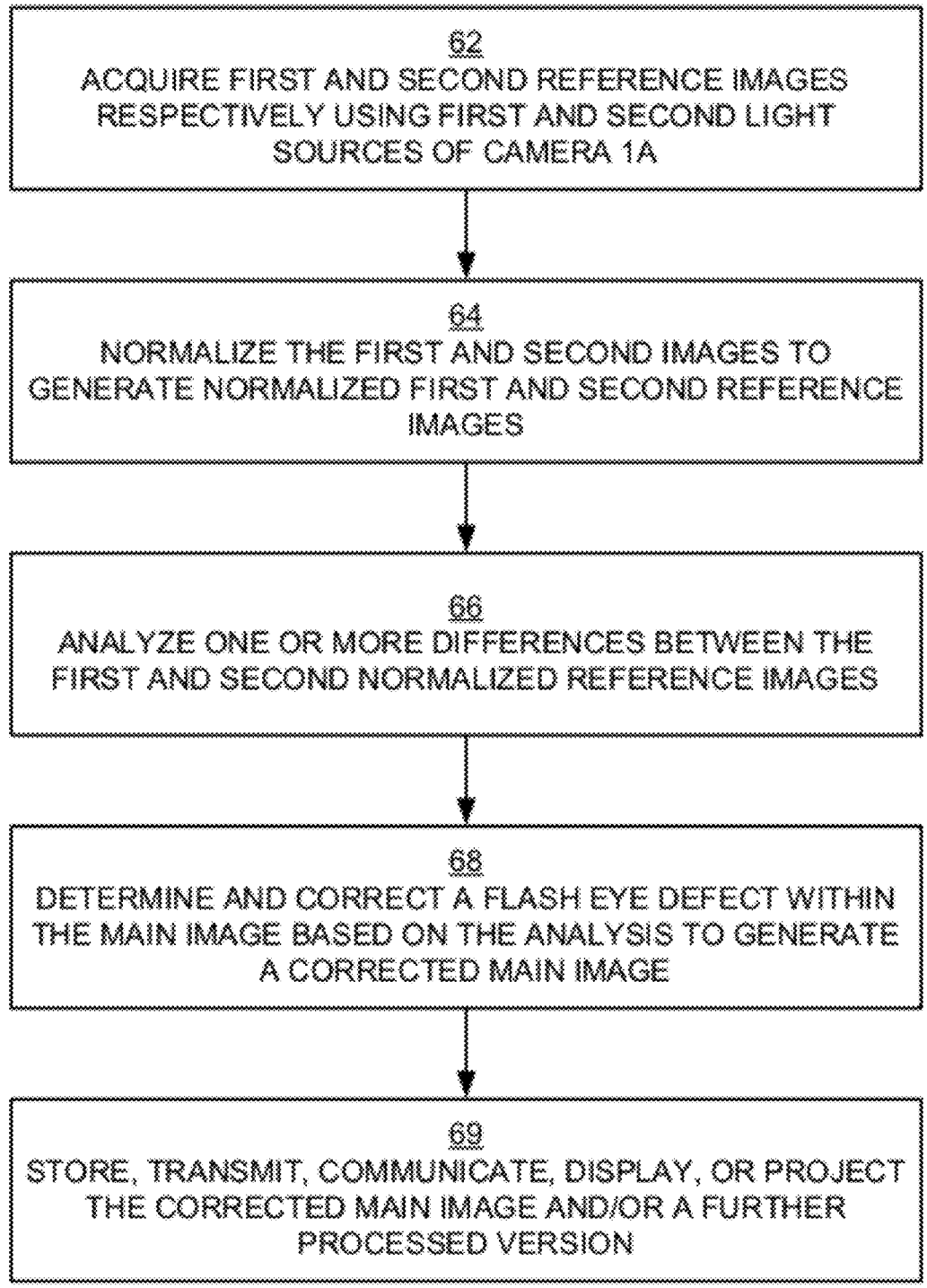
FIG. 7 is a block diagram illustrating a method in accordance with certain embodiments.

FIG. 7 illustrates a method involving the camera 1A of FIG. 5. First and second reference images are respectively acquired at 62 using the first and second light sources and optical system 4 of camera 1A of FIG. 5. The first and second images are normalized to generate normalized first and second reference images at 64. One or more differences between the first and second normalized reference images are analyzed at 66. A flash eye defect is determined and corrected within a main image based on the analyzing to generate a corrected main image at 68. The corrected main image and/or a further processed version is/are stored, transmitted, communicated, displayed, and/or projected at 69.

Figure 8:
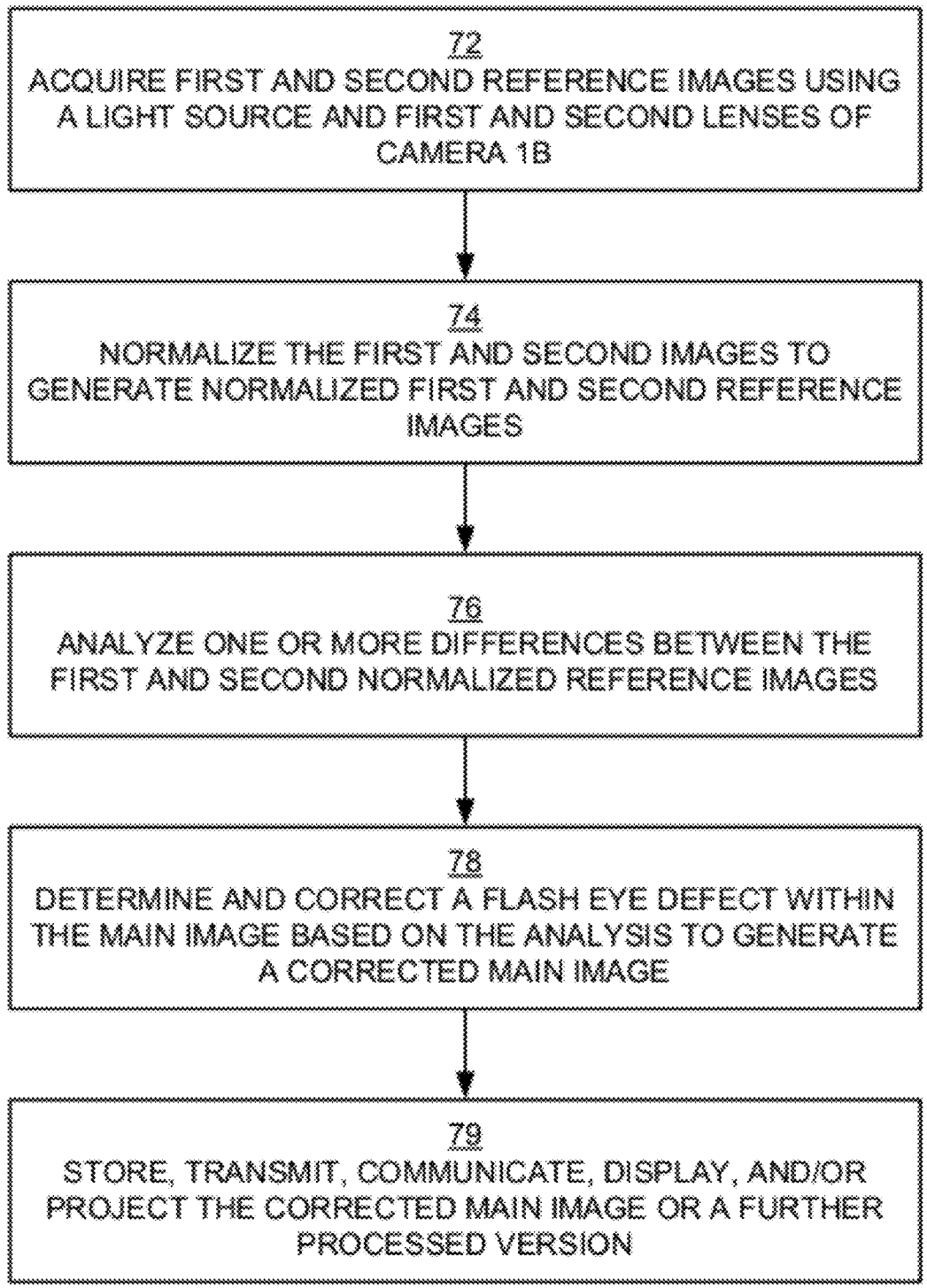
FIG. 8 is a block diagram illustrating a method in accordance with further embodiments.

FIG. 8 illustrates a method involving the camera 1B of FIG. 6. First and second reference images are acquired at 72 using a light source 12 and first and second lenses 14a, 14b of camera 1B of FIG. 6. First and second images are normalized at 74 to generate normalized first and second reference images. One or more differences between the first and second normalized reference images are analyzed at 76. A flash eye defect within the main image is determined and corrected based on the analysis to generate a corrected main image at 78. The corrected main image and/or a further processed version is/are stored, transmitted, communicated, displayed, and/or projected at 79.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims, and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above herein, as well as the background, invention summary, abstract and brief description of the drawings, are all incorporated by reference into the detailed description of the preferred embodiments as disclosing alternative embodiments. In addition, the following are incorporated by reference:

U.S. Pat. Nos. 6,407,777, 7,042,505, 7,352,394, 7,362,368, 7,269,292, 7,369,712, 6,035,072, 7,336,821, 7,315,631, and 7,295,233, United States published patent applications 2004/0223063, 2005/0041121, 2005/0140801, 2006/0120599, 2006/0093213, 2007/0116379, 2006/0039690, 2007/0116380, and 2007/0201724

U.S. patent applications Ser. Nos. 11/573,713, 11/462,035, 12/421,335, 11/761,647, 11/753,098, 12/038,777, 12/043,025, 11/752,925, 11/836,773, 11/767,412, 11/624,683, 60/945,558, 60/892,884, 11/861,257, 61/024,551, 11/937,377, and 61/023,855.

What is claimed is:

1. A portable digital image acquisition device, comprising:
   (a) first and second lenses and at least one sensor for acquiring a main digital image and first and second reference images;
   (b) a light source disposed at different distances from the first and second lenses for illuminating one or more objects within an acquired scene;
   (c) a memory for storing the main digital image;
   (d) one or more processor-readable media having digital code embedded therein for programming a processor to perform a method of determining and correcting a flash eye defect in the main digital image using the first and second reference images, wherein the method comprises:
      (i) acquiring the first and second reference images using the light source and the first and second lenses respectively;
      (ii) normalizing the first and second images to generate normalized first and second reference images;
      (iii) analyzing one or more differences between the first and second normalized reference images;
      (iv) determining and correcting the flash eye defect within the main image based on the analyzing to generate a corrected main image; and
      (v) storing, transmitting, communicating, displaying, or projecting the corrected main image or a further processed version, or combinations thereof.

2. The device of claim 1, wherein the analyzing comprises subtracting the first and second reference images.

3. The device of claim 1, wherein the normalizing comprises luminance normalizing.

4. The device of claim 1, wherein the flash eye defect comprises a red eye defect.

5. The device of claim 1, wherein the normalizing comprises re-sizing one or both of the first and second reference images.

6. The device of claim 1, wherein the normalizing comprises aligning the first and second reference images.

7. The device of claim 6, wherein the aligning comprises aligning one or more eyes within the first and second images.

8. The device of claim 1, wherein the differences comprise color differences.

9. The device of claim 1, wherein the differences comprise brightness differences.

10. The device of claim 1, wherein the first and second reference images are each acquired using relatively low-intensity pre-flashes compared with an intensity of a flash used in acquiring the main digital image.

11. The device of claim 1, wherein the analyzing takes into account the specific different distances from the first and second lenses of the light source.

12. The device of claim 11, wherein the analyzing further takes into account distance to one or more objects, a gaze angle, an ambient lighting condition, color of an iris or a skin tone of a face within the acquired scene, or combinations thereof.

13. The device of claim 1, wherein the first and second preview images are acquired consecutively prior to acquiring the main digital image.

14. A method of determining and correcting a flash eye defect in a main digital image using first and second reference images, wherein the method comprises using a processor-based digital image acquisition device to perform the following: (i) acquiring first and second reference images using a light source and first and second lenses respectively disposed different distances from the light source; (ii) normalizing the first and second images to generate normalized first and second reference images; (iii) analyzing one or more differences between the first and second normalized reference images; (iv) determining and correcting a flash eye defect within the main image based on the analyzing to generate a corrected main image; (v) storing, transmitting, communicating, displaying, or projecting the corrected main image or a further processed version, or combinations thereof.

15. The method of claim 14, wherein the analyzing comprises subtracting the first and second reference images.

16. The method of claim 14, wherein the normalizing comprises luminance normalizing.

17. The method of claim 14, wherein the flash eye defect comprises a red eye defect.

18. The method of claim 14, wherein the normalizing comprises re-sizing one or both of the first and second reference images.

19. The method of claim 14, wherein the normalizing comprises aligning the first and second reference images.

20. The method of claim 19, wherein the aligning comprises aligning one or more eyes within the first and second images.

21. The method of claim 14, wherein the differences comprise color differences.

22. The method of claim 14, wherein the differences comprise brightness differences.

23. The method of claim 14, wherein the first and second reference images are each acquired using relatively low-intensity pre-flashes compared with an intensity of a flash used in acquiring the main digital image.

24. The method of claim 14, wherein the analyzing takes into account the specific different distances from the first and second lenses of the light source.

25. The method of claim 24, wherein the analyzing further takes into account distance to one or more objects, a gaze angle, an ambient lighting condition, color of an iris or a skin tone of a face within the acquired scene, or combinations thereof.

26. The method of claim 14, wherein the first and second preview images are acquired consecutively prior to acquiring the main digital image.

27. One or more non-transitory processor-readable media having digital code embedded therein for programming a processor to perform a method of determining and correcting a flash eye defect in a main digital image using first and second reference images, wherein the method comprises:
 (i) acquiring the first and second reference images using a light source and first and second lenses respectively disposed at different distances from the light source;
 (ii) normalizing the first and second images to generate normalized first and second reference images;
 (iii) analyzing one or more differences between the first and second normalized reference images;
 (iv) determining and correcting a flash eye defect within the main image based on the analyzing to generate a corrected main image; and
 (v) storing, transmitting, communicating, displaying, or projecting the corrected main image or a further processed version, or combinations thereof.

28. The one or more media of claim 27, wherein the analyzing comprises subtracting the first and second reference images.

29. The one or more media of claim 27, wherein the normalizing comprises luminance normalizing.

30. The one or more media of claim 27, wherein the flash eye defect comprises a red eye defect.

31. The one or more media of claim 27, wherein the normalizing comprises re-sizing one or both of the first and second reference images.

32. The one or more media of claim 27, wherein the normalizing comprises aligning the first and second reference images.

33. The one or more media of claim 32, wherein the aligning comprises aligning one or more eyes within the first and second images.

34. The one or more media of claim 27, wherein the differences comprise color differences.

35. The one or more media of claim 27, wherein the differences comprise brightness differences.

36. The one or more media of claim 27, wherein the first and second reference images are each acquired using relatively low-intensity pre-flashes compared with an intensity of a flash used in acquiring the main digital image.

37. The one or more media of claim 27, wherein the analyzing takes into account the specific different distances from the first and second lenses of the light source.

38. The one or more media of claim 37, wherein the analyzing further takes into account distance to one or more objects, a gaze angle, an ambient lighting condition, color of an iris or a skin tone of a face within the acquired scene, or combinations thereof.

39. The one or more media of claim 27, wherein the first and second preview images are acquired consecutively prior to acquiring the main digital image.

* * * * *